United States Patent [19]
Getzoyan et al.

[11] Patent Number: 5,619,391
[45] Date of Patent: Apr. 8, 1997

[54] DISC CARTRIDGE WITH OPPOSING SETS OF CROSSED RIBS DIRECTLY PRESSING WIPING MEMBERS INTO CONTACT WITH BOTH SIDES OF DISC

[75] Inventors: Jacques S. Getzoyan, Rockland; John G. Kennedy, Bridgewater; Stephen P. Joslin, Brewster, all of Mass.

[73] Assignee: Kao Infosystems Company, Plymouth, Mass.

[21] Appl. No.: 533,635

[22] Filed: Sep. 25, 1995

[51] Int. Cl.$^6$ ............................................. G11B 23/033
[52] U.S. Cl. ............................................................ 360/133
[58] Field of Search .................................. 360/133, 137; 369/291

[56] References Cited

U.S. PATENT DOCUMENTS

| | | | |
|---|---|---|---|
| 4,626,949 | 12/1986 | Brock et al. | 360/133 |
| 4,750,075 | 6/1988 | Oishi | 360/133 |
| 4,789,916 | 12/1988 | Oishi | 360/133 |
| 4,839,766 | 6/1989 | Kato | 360/133 |
| 4,843,511 | 6/1989 | Downey | 360/133 |
| 5,083,231 | 1/1992 | Veenstra et al. | 360/133 |
| 5,326,608 | 7/1994 | Ikebe et al. | 360/133 |

*Primary Examiner*—Robert S. Tupper
*Assistant Examiner*—Craig A. Renner
*Attorney, Agent, or Firm*—Jeffrey I. Kaplan

[57] ABSTRACT

A magnetic disc cartridge includes two sets of opposing ribs arranged on opposite sides of the cartridge so that each rib of one set of ribs is skew with respect to each rib of the other set of ribs. The ribs exert pressure on both sides of a rotating medium via wiper elements, which sandwich the medium, so as to clean debris from both sides of the medium while maintaining medium planarity in a region defined between the two sets of opposing ribs. Optionally, each rib of the one set of ribs may cross perpendicularly with respect to each rib of the other of the sets of ribs.

10 Claims, 4 Drawing Sheets

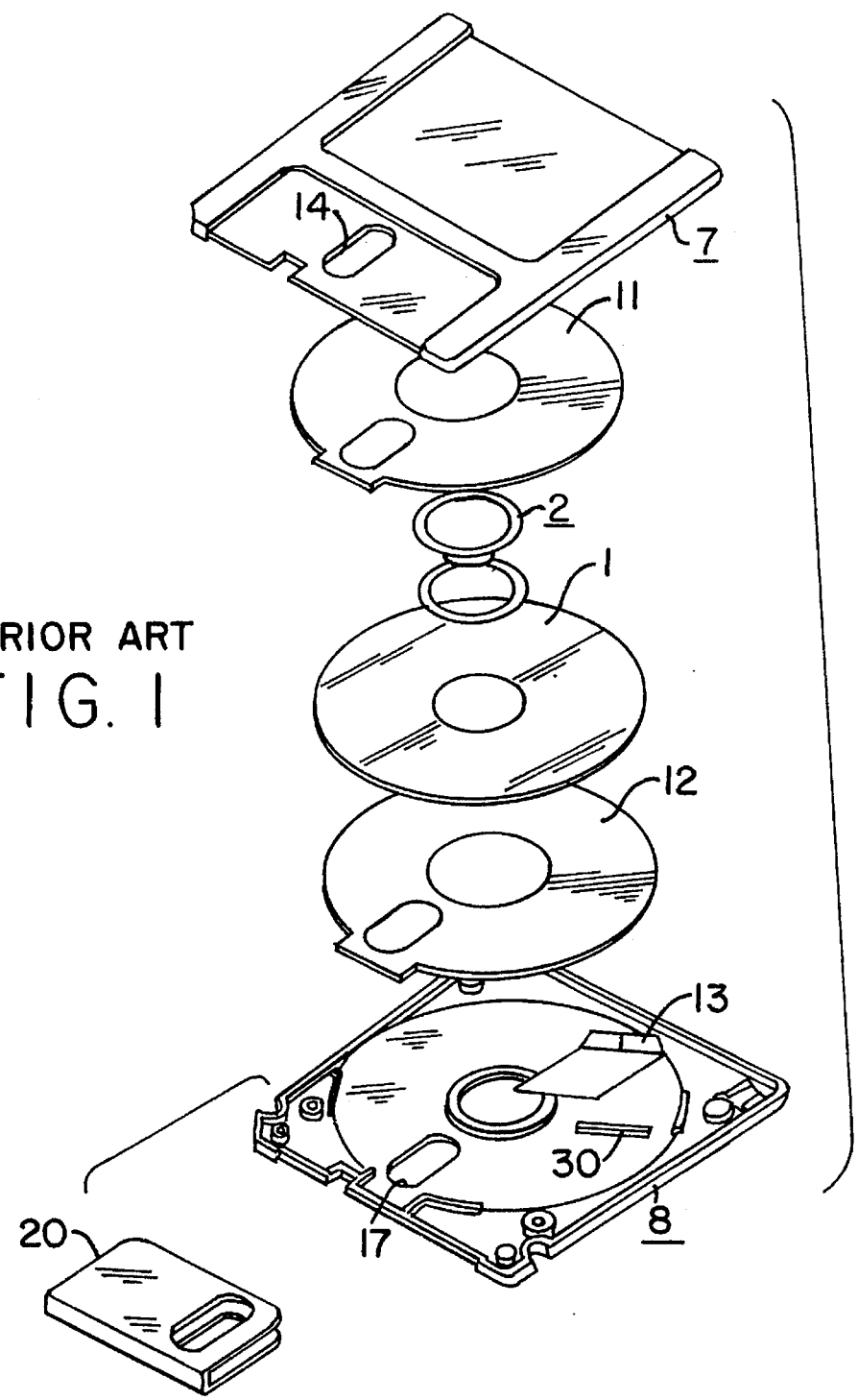
PRIOR ART
FIG. 1
PRIOR ART
FIG. 2

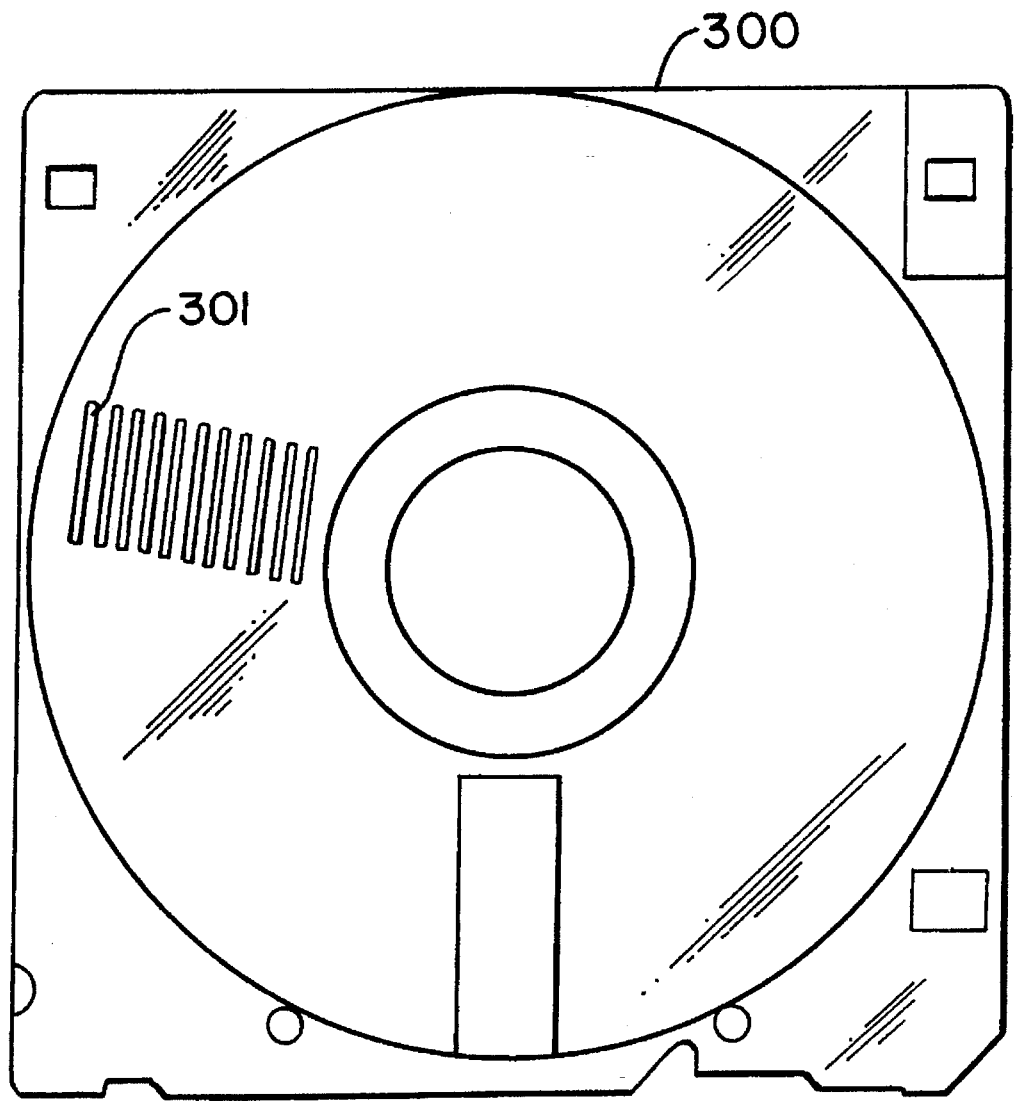
FIG. 3

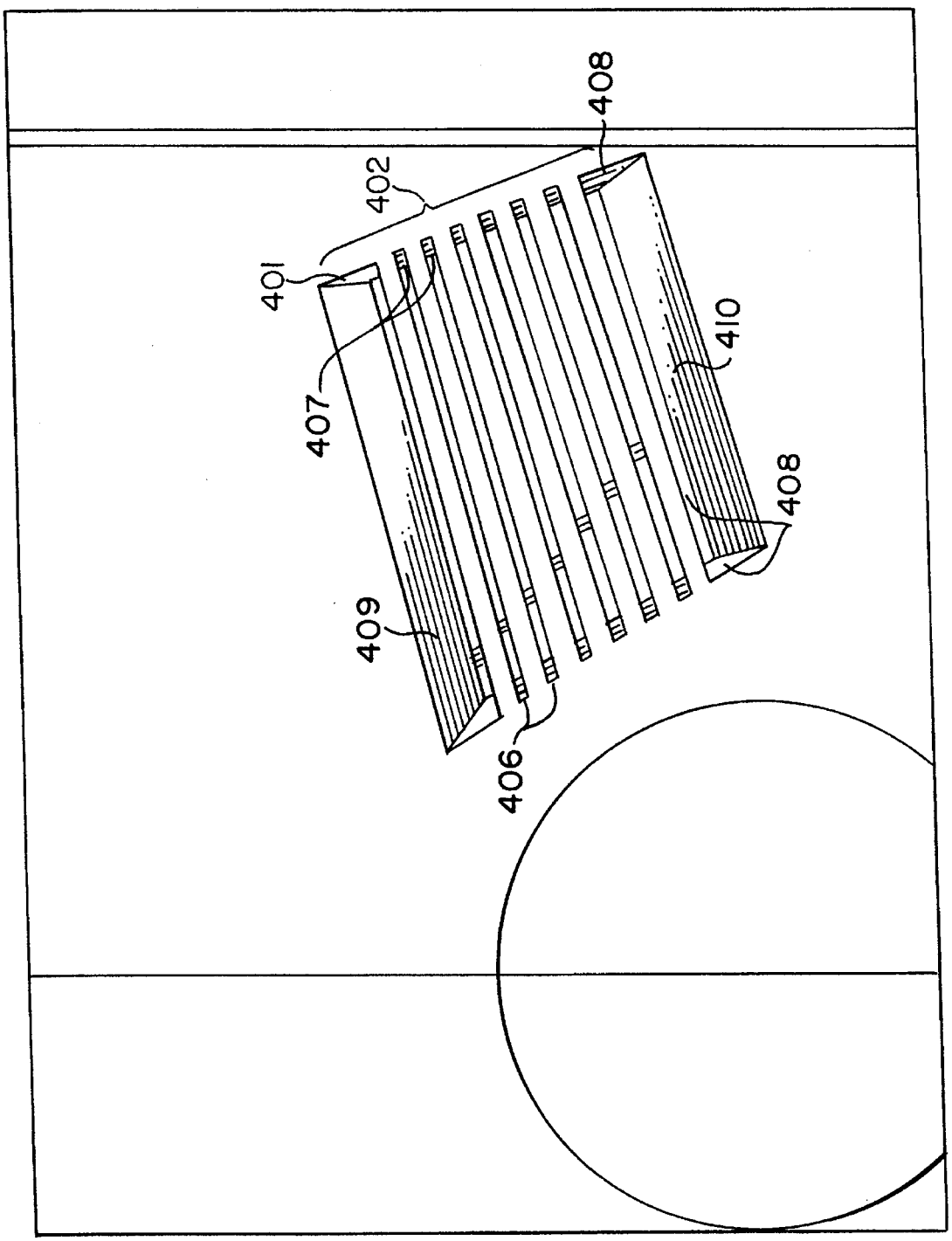
FIG.4

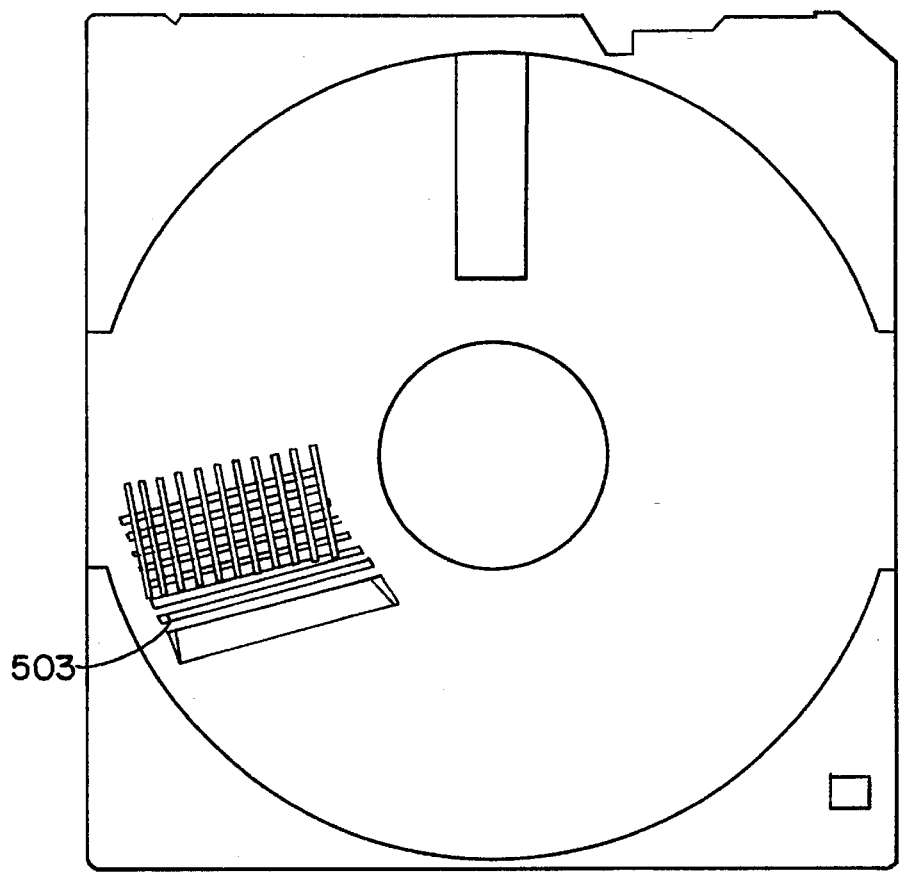
FIG. 5
FIG. 6

DISC CARTRIDGE WITH OPPOSING SETS OF CROSSED RIBS DIRECTLY PRESSING WIPING MEMBERS INTO CONTACT WITH BOTH SIDES OF DISC

TECHNICAL FIELD

This invention relates to data storage technology, and more specifically, to an improved technique of removing dust, debris, and other undesirable particles from rotating magnetic media of the type usually employed in personal computers.

BACKGROUND OF THE INVENTION

Over the past several years, the use of magnetic media has increased greatly. Magnetic storage technology provides an inexpensive and fairly reliable high density media for storage of all types of data associated with personal computers. For example, electronic versions of images, documents, facsimiles, etc. may all be stored conveniently and compactly on magnetic media.

Typically, a circular thin sheet of magnetic material is mounted on a central metal hub, and is encased within a plastic shell. The plastic shell has an upper and lower portion thereof which portions are bonded together to form the entire enclosure.

FIG. 1 shows a typical prior art magnetic disc as it is assembled. The arrangement of FIG. 1 includes an upper member 7, and a lower member 8, which are preferably made of plastic compounds. Two wiper elements, 11 and 12, are made of cloth in accordance with techniques known to those of ordinary skill in the art. The magnetic medium 1 is then sandwiched between wiper elements 11 and 12 by connection of the upper and lower members 7 and 8 respectively. A metal hub 2 is installed at the center of the disc to facilitate rotation, and a shutter 20 is mounted across the openings 14 and 17 of the upper and lower members 7 and 8 respectively, all in accordance with techniques well known to those of ordinary skill in this art.

A lifter tab 13 is mounted behind a rib 30 in order to assist the wiper elements 11 and 12 in cleaning the debris from magnetic medium 1. The lifter tab 13 is usually manufactured from a thin plastic material. The resiliency of the lifter tab tends to press cleaning element 12 against magnetic medium 1 in order to facilitate cleaning of magnetic medium 1.

FIG. 2 shows a side cross sectional view of the lifter tab 13 as installed in the completed disc. The rib 30 causes lifter tab 13 to be forced upwardly into contact with wiper element 12, which causes wiper element 12 to exert a small amount of pressure on magnetic medium 1. The pressure is sufficient to cause a sandwiching of magnetic medium 1 between wiper elements 11 and 12, thereby assisting the wiper elements in removing articles of debris from magnetic medium 1.

It is generally recognized in the industry that the lifter tab is required in order to prevent rapid degradation in the performance of magnetic media due to the build up of dust and dirt particles. First, the lifter tab itself constitutes an additional part which is subject to failure. Second, it increases the assembly time because it adds an additional step to the manufacturing process; namely, the mounting of the lifter tab. Of course, this step must be accomplished at the proper location, orientation, etc., and also requires some type of glue or other adhesive.

Another prior art magnetic storage medium is disclosed in U.S. Pat. No. 4,626,949 to Brock. Brock, as best seen by FIG. 2 thereof, discloses the use of ribs which cause a bending of the magnetic medium. This reference explicitly teaches that the magnetic medium should be forced to bend in alternate directions (i.e.; up and down) as the medium rotates within the cartridge. (See FIG. 2 and associated text at col. 4, line 7–11, explaining the "bending about the projections") However, the bending creates increased wear and tear on the disc.

In view of the above problem, it can be appreciated that there exists an unsolved need in the prior art for a technique that allows proper debris removal from the magnetic medium, yet eliminates the complex manufacturing step of installing the lifter tab as well as the need for the lifter tab itself.

SUMMARY OF THE INVENTION

The above and other problems of the prior art are solved and a technical advance is achieved in accordance with the present invention which relates to a new technique for facilitating debris removal. In accordance with the invention, a set of substantially radial lifter ribs is formed on the lower member of the disc, said lifter ribs extending substantially longitudinally in a direction which differs from the longitudinal direction of the parallel projections which typically oppose the lifter tab 13. Preferably, the lifter ribs longitudinal direction is perpendicular to that of the parallel projections, thus preventing the lifter ribs from becoming disposed between the parallel projections, and thereby causing the magnetic medium 1 to bend between the ribs and projections. Additionally, the lifter ribs are preferably integrally formed during the molding process of the lower member.

Another feature of the present invention utilizes slopes at the ends of the lifter ribs in order to prevent sharp edges from causing damage to the magnetic medium.

Another feature of the invention utilizes a combined height of lifter ribs and parallel projections such that the proper amount of pressure is exerted by the wiper elements in order to provide for sufficient cleaning of the magnetic medium.

In another preferred embodiment, the plurality of lifter ribs are manufactured substantially uniformly except that the lifter ribs at each end of the series are significantly wider and more sloped, in order to provide a gradual transition of the magnetic medium from a state where no pressure is exerted thereon, to a state where pressure is exerted thereon.

BRIEF DESCRIPTION OF THE DRAWINGS

FIG. 1 shows the assembly of a typical prior art 3½ inch magnetic storage medium;

FIG. 2 shows a cross sectional view of a lifter tab and rib used to effectuate debris removal from the magnetic medium employed in a prior art disc;

FIG. 3 shows an upper member 300 with a plurality of parallel projections 301;

FIG. 4 depicts a lower disc member showing that the lifter tab has been replaced with a plurality of lifter ribs which are substantially perpendicular longitudinally to the longitudinal direction of the parallel projection 301.

FIG. 5 shows a perspective view of an assembled magnetic disc cartridge in accordance with the present invention; and FIG. 6 is a side cross sectional view of the lifters ribs.

DETAILED DESCRIPTION OF THE PREFERRED EMBODIMENT

FIG. 3 shows a plurality of parallel projections 301. The parallel projections are integrally molded into upper member 7 to be used in manufacture of a disc. The length of the parallel projection is approximately 0.512 inches, the height approximately 0.018 inches, and the width of each projection is approximately 0.023 inches. The parallel projections may be integrally molded into, or separately attached to, upper member 7.

FIG. 4 shows a close up of the lifter ribs which are specially designed and integrally molded into the lower member 8 of the disc in order to provide an opposing surface to the parallel projections. Specifically, slope 401 provides a smooth transition for the magnetic medium as it rotates onto the surface of lifter ribs 402. It is noted that the longitudinal direction of lifter ribs 402 is in a direction which is, when the disc is assembled, substantially perpendicular to that of parallel projections 301. This is best shown by FIG. 5, where the upper and lower members have been superimposed upon one another in order to indicate the positional relationship between parallel projections 301 and lifter ribs 402.

It can best be appreciated from FIG. 5 that there is a portion of the lifter ribs 402 that does not directly overlay the parallel projections 301. This arrangement allows the maximum surface area of the disc to be wiped clean of debris by the lifter ribs and parallel projections.

It is noted that lifter ribs 402 each contain a tapered inner edge 406 and a tapered outer edge 407. Additionally, two of the lifter ribs 402 contain tapered edges on three sides 408 thereof. In the sequence of eight lifter ribs shown in FIG. 4, the first and last such lifter ribs in the sequence, 409 and 410, respectively each have three sides with tapered edges.

Several important features of applicant's invention can best be appreciated by reviewing FIG. 5. First, it is noted that the ribs and projections extend longitudinally in a different direction. Specifically, it is noted that while the parallel projections 301 are run longitudinally in a direction nearly radial, the lifter ribs 402 run in a direction which is almost perpendicular to a radius of the circular magnetic medium. This prevents the ribs and projections from interleaving with one another as shown in the prior art Brock patent discussed above. Accordingly, the lifter ribs 402 and parallel projections 301 respectively act as two smooth surfaces which exert pressure on the wiper elements (not shown) and serve to clean the magnetic medium.

If the plural lifter ribs 402 and parallel projections 301 extended in the same longitudinal direction, then it would require precise manufacturing in order to prevent the lifter ribs 402 and parallel projections 301 from becoming interleaved and bending the magnetic medium.

Second, there is a portion of the lifter ribs, designated as 503, which extends beyond the end of the parallel projections. Thus, a portion of the lifter ribs is not opposed by the parallel projections. This too results in improved performance. Additionally, the lifter ribs 401 are long enough to cover the entire radial length of the surface of the magnetic medium thereby providing thorough cleaning.

The lifter ribs are molded integrally from the same material as the disc cartridge. Thus, the resiliency is the same, and the lifter ribs should wear down no faster than the cartridge itself.

FIG. 6 indicates the preferred height for the lifter ribs and slopes thereof. It has been found that the use of the dimensions indicated in FIG. 6 provides for optimum performance and indeed very closely resembles the performance using the conventional lifter tab. The dimensions of the parallel projections 301 are known in the prior art.

The above describes the preferred embodiments of the invention, but it will be appreciated to those of ordinary skill in the art that various modifications and/or additions may be made without violating the spirit or scope of the invention. Such modifications and/or additions are intended to be covered by the following claims.

We claim:

1. A disc cartridge containing a medium sandwiched between wiper elements, said disc cartridge comprising:

an upper member having a plurality of projections thereon;

a lower member having at least one lifter rib;

said at least one lifter rib having a longitudinal direction which is skew with respect to each longitudinal direction of said projections, said at least one lifter rib and said projections each directly contacting respective said wiper elements to cause pressure to be exerted on both sides of said medium by said respective wiper elements to clean dust and debris from said both sides of said medium, said at least one lifter rib and said projections directly opposing each other and crossing one another as viewed along a direction perpendicular to a plane defined by said projections so as to maintain medium planarity in a region defined between said projections and said at least one lifter rib while said dust and debris are cleaned from said both sides of said medium.

2. The disc cartridge of claim 1 wherein said at least one lifter rib comprises a tapered radially inner edge and a tapered radially outer edge on at least one of said at least one lifter rib.

3. The disc cartridge of claim 2 wherein said at least one lifter rib comprises at least two lifter ribs which each have tapered edges on three sides thereof.

4. The disc cartridge of claim 3 wherein the lifter ribs that have tapered edges on three sides thereof comprise a leading and trailing lifter rib.

5. The disc cartridge of claim 4 wherein the lifter ribs and the projections are positioned on the lower and upper members respectively such that there is at least one of said projections entirely outside an opposing area defined by said lifter ribs.

6. The disc cartridge of claim 5 wherein said projections are parallel.

7. The disc cartridge of claim 6 wherein said projections have a height of approximately 0.018 inches.

8. The disc cartridge of claim 7 wherein said lifter ribs have a length which occupies the entire radial length of said medium as said medium rotates.

9. The disc cartridge of claim 8 wherein said projections and said lifter ribs cross substantially perpendicularly with respect to one another.

10. A disk cartridge comprising:

a bottom portion having a first inner surface, said first inner surface including a first set of ribs integrally formed thereon;

a top portion having a second inner surface, said second inner surface having a second set of ribs thereon;

first and second wiper elements, disposed between said first and second sets of ribs;

a storage medium disposed between said first and second wiper elements;

said first and second sets of ribs being oriented such that at least a portion of said first set of ribs directly crosses at least a portion of said second set of ribs as viewed along a direction perpendicular to a plane defined by one of said first and second sets of ribs;

said ribs of said first set of ribs and said second set of ribs directly contacting respective said wiper elements to cause said respective wiper elements to exert pressure on both sides of said medium to clean debris from said both sides of said medium while maintaining medium planarity in a region defined between said first and second sets of ribs due to the direct crossing of said at least said portion of said first set of ribs with said at least said portion of said second set of ribs.

* * * * *